United States Patent [19]

Nakasone et al.

[11] Patent Number: 4,720,368

[45] Date of Patent: Jan. 19, 1988

[54] METHOD FOR FORMING A ROD-LIKE MOLDING

[75] Inventors: Takayoshi Nakasone; Tetuo Sibagaki, both of Gifu; Kenji Kozuka, Ichinomiya, all of Japan

[73] Assignee: Ube-Nitto Kasei Co., Ltd., Tokyo, Japan

[21] Appl. No.: 782,941

[22] Filed: Oct. 2, 1985

Related U.S. Application Data

[62] Division of Ser. No. 624,517, Jun. 25, 1984, abandoned.

[30] Foreign Application Priority Data

Jun. 28, 1983 [JP] Japan .................................. 58-115268
Jan. 23, 1984 [JP] Japan .................................... 59-8432

[51] Int. Cl.$^4$ .............................................. B29C 35/06
[52] U.S. Cl. ...................... 264/562; 264/570; 264/135; 264/174; 264/236; 264/347; 425/71; 425/112; 425/445
[58] Field of Search ............... 264/347, 135, 174, 345, 264/562, 570, 236; 425/112, 71, 445

[56] References Cited

U.S. PATENT DOCUMENTS

| | | | |
|---|---|---|---|
| 2,446,620 | 8/1948 | Swallow et al. | 264/236 |
| 2,721,820 | 10/1955 | Reis et al. | 264/174 |
| 2,770,014 | 11/1956 | Nordlin et al. | 264/162 |
| 3,290,420 | 12/1966 | Orser | 264/210 |
| 3,411,181 | 11/1968 | Cawley | 425/13 |
| 3,470,051 | 9/1969 | Meyer | 264/174 |
| 3,513,228 | 5/1970 | Miyauchi et al. | 264/85 |
| 3,529,050 | 9/1970 | Smith | 264/137 |
| 3,538,207 | 11/1970 | Toole | 264/85 |
| 3,588,954 | 6/1971 | Nakamura et al. | 425/445 |
| 3,865,466 | 2/1975 | Slaughter | 350/96 B |
| 3,946,097 | 3/1976 | Takahashi et al. | 264/135 |
| 3,993,726 | 11/1976 | Moyer | 264/174 |
| 4,038,018 | 7/1977 | Pepmeier | 425/505 |
| 4,089,923 | 5/1978 | Theodossi et al. | 264/146 |
| 4,156,104 | 5/1979 | Mondello | 174/70 R |
| 4,247,271 | 1/1981 | Yonekura et al. | 425/445 |
| 4,356,143 | 10/1982 | Hill et al. | 264/236 |
| 4,394,338 | 7/1983 | Fuwa | 425/505 |

FOREIGN PATENT DOCUMENTS

| | | |
|---|---|---|
| 0042996 | 1/1982 | European Pat. Off. |
| 1048370 | 11/1966 | United Kingdom |
| 1569905 | 6/1980 | United Kingdom |
| 2078996A | 1/1982 | United Kingdom |

*Primary Examiner*—Jeffery Thurlow
*Attorney, Agent, or Firm*—Wenderoth, Lind & Ponack

[57] ABSTRACT

A method of forming a fiber reinforced synthetic resin rod-like molding including a rod-like core portion having at least in the outer portion thereof a reinforcing fiber bundle integrally adhered together by a thermosetting resin and a thermoplastic resin layer coating the core portion is disclosed. The outer surface portion of the core portion and the inner surface portion of the thermoplastic resin layer are integrally adhered together due to an anchor effect generated by contacting between the thermosetting resin and the thermoplastic resin in a semifluid state under pressure.

4 Claims, 2 Drawing Figures

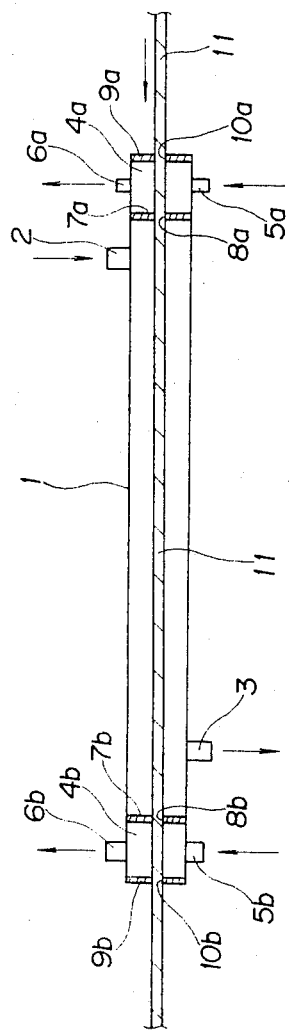
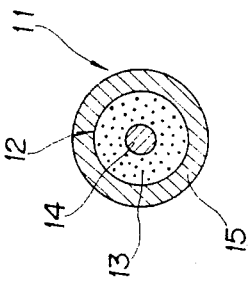
FIG.1
FIG.2

METHOD FOR FORMING A ROD-LIKE MOLDING

This is a division of application Ser. No. 624,517 filed June 25, 1984, now abandoned.

BACKGROUND OF THE INVENTION

This invention relates to a method of forming fiber reinforced synthetic resin rod-like molding comprising a rod-like core having at least on the outer portion thereof a reinforcing fiber bundle impregnated with a thermosetting resin and a thermoplastic resin layer for coating the core, and particularly to a method for hardening the thermosetting resin during the process of manufacturing the rod-like molding.

A rod-like molding comprising a core portion having a FRP at least on the outer portion thereof and coated with a thermoplastic resin layer is utilized in various fields of industry because of its excellent physical properties such as tensile strength and modulus of elasticity. Heretofore, there has been a known method for manufacturing such fiber reinforced synthetic resin continuous rod-like molding, wherein a molten thermoplastic resin is supplied onto the outer periphery of the core portion formed of a reinforcing fiber bundle impregnated with a nonhardened thermosetting resin. The coated core portion is immediately guided into a water basin so that only the thermoplastic resin layer is solidified by cooling while the thermosetting resin is kept nonhardened. Then this continuous rod-like semimolding with the nonhardened core is dipped into a hot water basin for hardening the thermosetting resin in order to obtain a desired tensile strength as well as modulus of elasticity.

Although the above mentioned method for treating the continuous rod-like molding by heating in the hot water basin provides a stable heating temperature and is very economical, when the thermosetting resin of the core portion and the thermoplastic resin of the layer are made of resins which do not have a good chemical affinity with each other, the intimacy or adhesion between them is not necessarily good. Such low adhesive strength decreases the mechanical strength of the rod-like molding and allows slippage of the thermoplastic outer layer relative to the core portion, which slippage is often caused by the fact that the thermosetting resin and the thermoplastic resin have difference coefficients of thermal expansion. In addition, this method limits productivity since a comparatively long time is required for the heat treatment.

The above method for manufacturing the fiber reinforced synthetic resin rod-like molding can be used, for example, to reinforce an optical fiber element. In that case, the optical fiber element is arranged in the center of the core portion, and enclosed by reinforcing fibers which are integrally adhered together by a thermosetting resin. In such optical fiber, the low degree of adhesion between the thermoplastic resin layer and the fiber reinforced resin of the core portion results in deterioration of the tensile strength, and flexural strength which could be one cause preventing this type of optical fiber from being put into practical use.

The present invention is provided in view of the above.

SUMMARY OF THE INVENTION

It is therefore an object of the present invention to provide a method of forming a fiber reinforced synthetic resin rod-like molding, wherein a core portion formed of a fiber reinforced thermosetting resin and a thermoplastic resin layer on the outer periphery of the core portion are very firmly adhered together, thus achieving excellent physical properties such as tensile strength and flexural strength.

It is another object of the present invention to provide a method of forming a fiber reinforced synthetic resin rod-like molding which is particularly suitable for use as an optical fiber.

Still a further object of the present invention is to provide a method for hardening the thermosetting resin contained in a fiber reinforced synthetic resin rod-like molding, wherein the thermosetting resin and a thermoplastic resin layer can be very firmly adhered together regardless of their chemical affinity, and productivity can be increased by shortening the time for heat treatment required for this adhesion and hardening the thermosetting resin.

An additional object of the present invention is to provide a particularly suitable method for hardening the thermosetting resin during the manufacture of an optical fiber.

In order to achieve the above and other objects, there is provided a method for forming a fiber reinforced synthetic resin rod-like molding comprising a rod-like core portion having at least in the outer portion thereof a reinforcing fiber bundle integrally adhered together by means of a thermosetting resin, and a thermoplastic resin layer coating the core portion, wherein the outer surface portion of the core portion and the inner surface portion of the thermoplastic resin layer are integrally adhered together due to an anchor effect generated by contacting the thermosetting resin and the thermoplastic resin in a semifluid state under pressure.

The core portion may include an optical fiber element disposed inside of and enclosed by the reinforcing fiber bundle.

More particularly, the method includes forming a core portion having at least in the outer portion thereof a reinforcing fiber bundle impregnated with a nonhardened thermosetting resin, coating the core portion with a molten thermoplastic resin, and hardening the thermosetting resin after cooling and solidifying the thermoplastic resin layer to form a semimolding. The hardening comprises the steps of introducing the semimolding into a hardening tub, and supplying to the tub a thermalmedium at a temperature in the vicinity of the melting point of the thermoplastic resin into the hardening tub under pressure, thereby to harden the thermosetting resin of the core portion and to simultaneously adhere the thermoplastic resin layer to the core portion due to the anchor effect.

Preferably, the thermal-medium is a vapor which is supplied into the hardening tub under a saturated vapor pressure according to a predetermined temperature. Alternatively, the thermal-medium may be a liquid.

An apparatus for hardening the thermosetting resin in accordance with the method of the invention comprises a hardening tub having a thermal-medium support port at one end of the outer periphery thereof and a discharge port at the other end of the outer periphery thereof, and first and second liquid basins provided in the end portions of the hardening tub along the direction of movement of the rod-like molding in such a manner as to intimately contact the hardening tub, each of the first and second liquid basins having an inlet port and an outlet port for a low temperature thermal-medium and equipped with means for maintaining the low temperature thermal-medium in a pressurized state, the hardening tub and the liquid basins being formed with openings for the rod-like molding to pass therethrough.

BRIEF DESCRIPTION OF THE DRAWINGS

FIG. 1 is a schematic view showing an apparatus for carrying out the method according to one embodiment of the present invention; and FIG. 2 is a sectional view showing a fiber reinforced resin rod-like molding formed according to one embodiment of the present invention.

DETAILED DESCRIPTION OF THE INVENTION

Preferred embodiments of the present invention will be described hereunder with reference to the accompanying drawings.

First of all, an apparatus for hardening a thermosetting resin in a fiber reinforced synthetic resin rod-like molding will be described.

In FIG. 1, reference numeral 1 denotes a narrow, tubular shaped hardening tub extending in the horizontal direction. One end of the outer periphery of the hardening tub 1 is provided with a supply port 2 for a thermal-medium heated to a predetermined temperature (more than 100° C.) and pressurized, while the other end thereof is provided with a discharge port 3. At the front and rear end portions of the hardening tub 1 are provided first and second liquid basins 4a, 4b. The lower side portions of the respective liquid basins 4a, 4b are formed with inlet ports 5a, 5b for a pressurized liquid, and under side portions thereof are formed with outlet ports 6a, 6b. The outlet ports 6a, 6b are provided with valves or other suitable members (not shown) so that the pressure of the liquid supplied to the liquid basins 4a, 4b may be maintained approximately the same as that of the thermal-medium to be supplied to the hardening tub 1. The hardening tub 1 and the liquid basins 4a, 4b are partitioned by first and second partitions 7a, 7b of vertical sheet shape, which are provided with openings 8a, 8b, respectively, at central portions thereof. The partitions 7a, 7b are made of a heat resistant rubber such as a silicon rubber. Also, vertical sheet-like rubber packings 9a, 9b are provided on the front and rear ends of the respective liquid basins 4a, 4b to define the latter. At central portions of these rubber packings 9a, 9b are formed openings 10a, 10b respectively. The openings 8a, 8b formed in partition-walls 7a, 7b and the openings 10a, 10b formed in the rubber packings 9a, 9b are in alignment with each other.

The above apparatus is designed to harden a thermosetting resin in a rod-like semimolding 11. The semimolding 11 is obtained by the following known steps. Firstly, a reinforcing fiber bundle is impregnated with a thermosetting resin to form a core portion. The core portion is coated with a molten thermoplastic resin material which in turn is cooled and solidified to form the outer layer, thus providing the rod-like semimolding in which the thermosetting resin is nonhardened.

This semimolding 11 enters the first liquid basin 4a through the opening 10a in the front rubber packing 9a and then is guided to the hardening tub 1 through the opening 8a in the first partition-wall 7a. The rod-like molding 11 having been treated in the hardening tub 1 by heating enters into the second liquid basin 4b through the opening 8b in the second partition-wall 7b and then is carried outside through the opening 10b of the rubber packing 9b. Preferably, the opening 8b of the second partition-wall 7b has a slightly larger diameter than that of the rod-like molding 11 so that the rod-like molding 11 will not contact opening 8b, the advantage thereof being set forth hereinafter.

The method of the present invention for treating the semimolding 11 by heating using the above apparatus, and hardening the thermosetting resin contained therein now will be described in more detail.

Firstly, a thermal-medium which is heated to more than 100° C. and pressurized is supplied into the hardening tub 1 through the supply port 2. Also, a pressurized cold liquid is supplied into both basins 4a, 4b through the inlet ports 5a, 5b, and a predetermined amount of such liquid is discharged through the outlet ports 6a, 6b in order to maintain the pressure within the basins 4a, 4b approximately the same as that in the hardening tub 1. In this state, the semimolding 11 is introduced into the hardening tub 1 through the openings 10a, 8a of the first water basin 4a. As mentioned before, this semimolding 11 is made by coating the core portion comprising a reinforcing fiber bundle impregnated with a nonhardened thermosetting resin with the molten thermoplastic resin, and cooling and solidifying the thermoplastic resin layer immediately thereafter. The temperature of the thermal-medium supplied to the hardening tub 1 is set to be somewhere in the vicinity of the melting point of the coated thermoplastic resin of the semimolding 11, for example, from 140° to 150° C. when the thermoplastic resin is nylon 12, from 120° to 140° C. when the resin is low-density polyethylene, and from 130° to 150° C. when the resin is a polypropylene. A vapor can be used as the thermal-medium and the pressure therefor is preferably the saturated vapor pressure according to the predetermined temperature. The temperature and the pressure of the vapor supplied into the hardening tub 1 are controlled by a pressure reducing valve (not shown). Alternatively, a liquid may be used as the thermal-medium. As a liquid thermal-medium, pressurized water, hot oil, an organic thermal-medium or the like may be employed. Pressurized water is recommended, not only because it is economical but also since it is not necessary to treat the thermal-medium attached to the surface of the molding 11 after passage thereof through the hardening tub 1. For the same reasons, a water is preferable for use as a low-temperature thermal-medium for filling the basins 4a, 4b. The temperature and pressure of the liquid thermal-medium supplied into the hardening tub 1 are controlled in a circulating tank (not shown) and the liquid thermal-medium is supplied into the hardening tub by a pump. When the thermal-medium is liquid, the rod-like molding 11 is prevented from being scratched at the bottom of the hardening tub due to its own gravity, since the molding 11 has buoyancy within the thermal-medium.

Also, when the liquid thermal-medium is employed, it is supplied into the hardening tub 1 preferably from the lower side thereof. Thus, the lower port 3 shown in FIG. 1 may be used to supply the liquid thermal-medium into the tub 1 while the upper port 2 may serve as the discharge port.

When the temperature of the thermal-medium is set to be somewhere in the vicinity of the melting point of the coated thermoplastic resin of the rod-like molding 11, preferably to be a slightly higher temperature than that of the melting point, the interface between the core portion and the thermoplastic resin layer becomes higher in temperature than that of the thermal-medium due to additional heat generated in the hardening reaction of the thermosetting resin. As a result, the inner surface portion of the thermoplastic resin layer is molten, whereby the core portion and the coated resin are adhered together due to an anchor effect under pressure. On the other hand, the outer surface of the thermoplastic resin layer contacting the thermal-medium is maintained at approximately the same temperature as that of the thermal-medium. As a result, the configuration of the molding 11 can be maintained.

The rod-like molding 11 treated as mentioned above in the hardening tub 11 is then introduced into the second liquid basin 4b. At this time, the opening 8b formed in the second partition-wall 7b between the hardening tub 1 and the second basin 4b should preferably be formed of slightly larger diameter than that of the rod-like molding 11 in order not to contact with the thermoplastic resin layer which is then in a molten state. In this second liquid basin 4b, the thermoplastic resin layer is immediately cooled and solidified. The second basin 4b and the first basin 4a are liquid seals to prevent discharge of the thermal-medium from the hardening tub 1 and to avoid a pressure decrease in the tub. The second liquid basin 4b also serves as a cooling basin for cooling and solidifying the thermoplastic resin layer. After being cooled in liquid basin 4b, the rod-like molding 11 is discharged.

The outer surface of the rod-like molding 11 thus treated is shaped somewhat rough including concave and convex areas due to the thermal-medium. When a smooth surface is required, it can be treated in accordance with the teaching of U.S. patent application No. 829,860 "Method of shaping a continuous rod-like molding, and apparatus for shaping same".

In the above rod-like molding 11, since the thermosetting resin impregnated in the reinforcing fiber bundle of the core portion and the thermoplastic resin in the outer layer are adhered to each other at the time both resins are in the semifluid state and subjected to pressure, the adhesion becomes very strong due to the so called "anchor effect", much stronger than the adhesive strength of the rod-like molding obtained according to the conventional method. This will become more apparent from concrete examples which will be described later.

In accordance with such increase of the adhesive strength, the flexural strength is increased. That is, assuming that the rod-like molding 11 is subjected to a bending force, the minimum radius at which the molding 11 is fractured is improved by approximately 20% compared with the case where the thermoplastic resin layer is not adhered. The improved adhesion prevents the thermoplastic resin layer from expanding or contracting in the axial direction separately from the core portion even if the two resins have different coefficients of thermal expansion. That is advantageous because, for example, one need not take into account such difference in coefficients of thermal expansion during use of the rod-like molding. Also, the heat treatment for hardening the core portion can be carried out at a speed approximately 3 to 5 times higher than with the conventional method. Furthermore, since the adhesion between the core portion and the thermoplastic resin layer is firm, when the coated thermoplastic resin is heated and molten again in accordance with the method of U.S. patent application No. 829,860 in order to achieve a smooth surface and shape it thinner, the molding can be shaped easily at a high speed and an extremely thin coating layer can be obtained, since the two members are not dissociated at the interface.

When the rod-like molding is used as a frame for various structures such as an agricultural hothouse or as a tension member, the core portion thereof may comprise preferably a reinforcing fiber bundle of a predetermined number of rovings made of glass fibers or aromatic polyamide fibers having a diameter of a single yarn of from 9 to 13 microns, impregnated with a thermosetting resin of an unsaturated polyester resin added with several parts of peroxide catalyst. Also, when the rod-like molding 11 is used as an optical fiber, the core portion includes an optical fiber element inside the reinforcing fiber bundle. In this case, the core portion 12 comprises the reinforcing fiber bundle 13 impregnated with the thermosetting resin, and the optical fiber element 14 disposed within and enclosed by the reinforcing fiber bundle 13 as shown in FIG. 2. The thermosetting resin impregnated in the bundle 13 is hardened in the hardening tub 1. As a result, the fiber bundle 13 and the thermoplastic resin layer 15 are integrally adhered together due to the anchor effect.

The reason the rod-like molding 11 according to the present invention renders a high adhesive strength between the core portion and the thermoplastic resin layer is that the interface therebetween is not made smooth, i.e. the contacting surfaces are non-smooth, since the core portion and the layer contact each other in a semifluid state under pressure and a sufficient coupling force, i.e. the anchor effect, is generated therebetween. The pressure prevents the thermosetting resin from evaporating. The thermoplastic resin and the non-hardened thermosetting resin are pressurized and adhered together in a semifluid state. Even if the hardening reaction starts thereafter, this pressurized contact is maintained or promoted so that an anchored adhesive structure is achieved. A presumption may be made that a polymerization monomer such as a stylene in the thermosetting resin and peroxide as a hardening catalyst are partly transferred into or act on the molten thermoplastic resin to provide a cross-linking structure at the interface. This may be another main cause of increased adhesive strenght, however, this is not yet confirmed.

To further illustrate the present invention, not by way of limitation, concrete examples of the present invention will be described.

EXAMPLES

A predetermined number of rovings gathered together and each made of glass fibers having the diameter of a single yarn of 13 microns was used as a reinforcing fiber bundle. An unsaturated polyester resin containing an unsaturated alkyd resin and a styrene as a polymerization monomer and added with two parts of peroxide catalyst were used as a thermosetting. After this thermosetting resin was impregnated into the reinforcing fiber bundle, it was shaped by a throttle die into a rod-like configuration having an outer-diameter of 2 mm and a glass content of 75% by weight. The resultant product was introduced into a cross-head die and coated with a thermoplastic resin layer of an annular shape having a thickness of 1 mm. A linear-chain low-density polyethylene (melt index 1.0, gravity 0.918) was used as the thermoplastic resin. Immediately thereafter, the thermoplastic resin was cooled by water and solidified. The resultant rod-like semimolding was guided into the hardening apparatus of the present invention to harden the thermosetting resin in the reinforcing fiber bundle. At that time, vapor and pressurized water were used as a thermal-medium to obtain six samples (No. 1 to No. 6 in Table 1) by changing pressures and temperatures for each of the thermal-mediums. The adhesive strength against shearing force of the core portion and the thermoplastic resin were measured for each sample. Furthermore, for comparison purposes, a test was carried out to supply the thermal-medium into the hardening tub under normal pressure, and the sample (No. 7 in Table 1) thus obtained was measured with respect to its adhesive strength. In this case, a silicon oil was used as a thermal-medium.

The adhesive strength against shearing force was measured in the following manner. Firstly, each sample was cut to 200 mm in length, and an annular groove was defined at a position approximately 20 mm from one end thereof in the thermoplastic resin layer throughout the entire thickness thereof. Then, sheet-like handle portions each of approximately 50 mm length and made of the same resin as the thermoplastic resin layer were bonded to both ends of each sample, and the respective end portions and the handle portions were overwrapped approximately 18 mm. For each of thus prepared samples, a tensile test in the longitudinal direction at a speed of 5 mm/min. was conducted, and the force value when the thermoplastic resin layer of the 20 mm portion was peeled off from the core portion was sought, and this value was divided by the area or the dimension of the outer periphery of the core portion to obtain the adhesive strength.

The test results regarding this hardening condition and the adhesive strength are shown in Table 1.

TABLE 1

| SAMPLE NO. | THERMAL-MEDIUM | HARDENING CON. PRESSURE | TEMPER.* | ADHESIVE STRENGTH |
|---|---|---|---|---|
| 1 | VAPOR | 2.05 kg/cm$^2$ | 120° C. | 74 kg/cm$^2$ |
| 2 | | 2.8 | 130 | 92 |
| 3 | | 3.7 | 140 | 106 |
| 4 | | 4.9 | 150 | 106 |
| 5 | | 6.3 | 160 | 102 |
| 6 | WATER | 4.0 | 140 | 103 |
| 7 | SILICON OIL | NORMAL PRESSURE | 140 | IMMEASURABLE** |

Note:
*TEMPERATURE
**IMMEASURABLE DUE TO BAD SHAPING

When vapor is used as a thermal-medium, the vapor pressure was necessarily changed in order to change the temperature. The maximum adhesive strength was obtained at 140° C. and 150° C., and the shape of the molding was good. Regarding the pressurized water, when tried at 140° C. under a pressure of 4 kg/cm$^2$, a result similar to that of vapor at 140° C. was obtained. On the other hand, when silicon oil heated to 140° C. was supplied into the hardening tub 1 under the normal pressure, shape of the molding was so bad that the adhesive strength thereof was immeasurable. Also, the core portion became porous after hardened, and other physical properties of the molding such as tensile strength, fracture strength and modulus elasticity were decreased. This inferiority of the shape of the molding is because the thermosetting resin was partly evaporated and broke or destroyed the thermoplastic resin layer which was in the molten state.

Judging from the foregoing test results, it will be understood that it is important to supply the thermal-medium in a pressurized and heated state into the hardening tub in order to increase the adhesive strength between the core portion and the thermoplastic resin layer.

Although the present invention has been described with reference to preferred embodiments and examples thereof, many modifications and alterations may be made within the spirit of the present invention.

What is claimed is:

1. In a method of forming a fiber reinforced synthetic resin rod-like molding obtained by forming a core portion having at least in the outer portion thereof a reinforcing fiber bundle impregnated with non-hardened thermosetting resin, coating said core portion with a molten thermoplastic resin, cooling and solidifying said thermoplastic resin to form a semimolding with said thermosetting resin remaining non-hardened, and thereafter hardening said thermosetting resin, the improvement wherein said hardening comprises the steps of:

introducing said semimolding into a hardening tub;

supplying a thermal medium at a temperature in the vicinity of the molting point of said thermoplastic resin into said hardening tub, thereby softening said thermoplastic resin and hardening said thermosetting resin of said core portion;

maintaining said thermal medium at an elevated pressure and thereby pressing together at outer surface portion of said core portion and an inner surface portion of said thermoplastic resin layer while in respective semifluid states to achieve firm and integral adhesion therebetween due to an anchor effect; and thereafter again cooling and solidifying said thermoplastic resin.

2. The improvement claimed in claim 1, wherein said thermal medium is a vapor which is supplied into said hardening tub at a saturated pressure according to a predetermined temperature.

3. The improvement claimed in claim 1, wherein said thermal medium is a liquid.

4. The improvement claimed in claim 1, wherein said pressure causes said pressed together surface portions to be non-smooth, thereby increasing adhesion therebetween upon hardening thereof.

* * * * *